(12) United States Patent
Cheikh et al.

(10) Patent No.: US 11,010,854 B2
(45) Date of Patent: May 18, 2021

(54) ITEM HANDLING SYSTEM, METHOD AND APPARATUS THEREFOR

(71) Applicants: SITA Ypenburg BV, The Hague (NL); BlueBotics SA, St-Sulpice (CH)

(72) Inventors: Stephane Cheikh, Mayrin (CH); Steven Sebastiaan Vroonland, The Hague (NL); Koos Termeulen, The Hague (NL); Reinout Jules Reinhilde Vander Meulen, The Hague (NL); Julien Rochat, St-Sulpice (CH); Nicola Tomatis, St-Sulpice (CH); Luc Bergeron, Boussens (CH); Gregoire Terrien, Mayrin (CH)

(*) Notice: Subject to any disclaimer, the term of this patent is extended or adjusted under 35 U.S.C. 154(b) by 55 days.

(21) Appl. No.: 16/300,235

(22) PCT Filed: May 9, 2017

(86) PCT No.: PCT/EP2017/061100
§ 371 (c)(1),
(2) Date: Nov. 9, 2018

(87) PCT Pub. No.: WO2017/194565
PCT Pub. Date: Nov. 16, 2017

(65) Prior Publication Data
US 2019/0147558 A1 May 16, 2019

(30) Foreign Application Priority Data
May 10, 2016 (GB) .................................. 1608205.9

(51) Int. Cl.
*G06Q 50/30* (2012.01)
*B64F 1/36* (2017.01)
(Continued)

(52) U.S. Cl.
CPC ............. *G06Q 50/30* (2013.01); *B64F 1/366* (2013.01); *B64F 1/368* (2013.01); *G01G 19/52* (2013.01); *G06K 9/18* (2013.01); *G06K 9/4671* (2013.01)

(58) Field of Classification Search
CPC .......... G06Q 50/30; B64F 1/366; B64F 1/368
(Continued)

(56) References Cited

U.S. PATENT DOCUMENTS 6,607,066 B1 * 8/2003 Andersen ............. B65G 17/345
198/370.04
6,662,078 B1 * 12/2003 Hardgrave ............. G06Q 10/02
700/226

(Continued)

FOREIGN PATENT DOCUMENTS

| CN | 102141797 A | 8/2011 |
|---|---|---|
| DE | 102012105146 A1 | 12/2013 |
| KR | 20120097978 A | 9/2012 |

OTHER PUBLICATIONS

International Search Report & Written Opinion of the International Searching Authority, issued in International Application No. PCT/EP2017/061100, dated Oct. 23, 2017; 11 pages.
(Continued)

*Primary Examiner* — Michael G Lee
*Assistant Examiner* — David Tardif
(74) *Attorney, Agent, or Firm* — Morris, Manning & Martin, LLP; Daniel E. Sineway; Adam J. Thompson

(57) ABSTRACT

A mobile drive apparatus (1001) for item handling. The drive apparatus comprises at least one platform for supporting an item; a drive means; and a movable door (5003, 5001) coupled to the at least one platform and configured to move between an open position in which the platform is accessible to a user and a closed position in which the platform is enclosed. The apparatus further comprises control means coupled to the drive means. The control means are configured to control the drive means to move the drive apparatus from a current location associated with an item pickup point to a second different location for processing by an item handling hub, in response to receiving an indication that a token presented by the user is a valid token.

20 Claims, 9 Drawing Sheets

(51) Int. Cl.
     *G06K 9/46*          (2006.01)
     *G06K 9/18*          (2006.01)
     *G01G 19/52*        (2006.01)

(58) Field of Classification Search
     USPC .......................................................... 235/375
     See application file for complete search history.

(56) References Cited

U.S. PATENT DOCUMENTS

| | | | |
|---|---|---|---|
| 6,807,458 B2 | 10/2004 | Quackenbush | |
| 9,789,977 B2* | 10/2017 | Yepez | B64F 1/366 |
| 2010/0046152 A1* | 2/2010 | Ghobrial | G01G 19/52 |
| | | | 361/679.4 |
| 2013/0140361 A1* | 6/2013 | Ling | G06K 19/14 |
| | | | 235/380 |
| 2014/0136414 A1 | 5/2014 | Abhyanker | |
| 2015/0095254 A1* | 4/2015 | Naber | G06Q 10/02 |
| | | | 705/330 |
| 2015/0096813 A1* | 4/2015 | Aumente | G07B 15/00 |
| | | | 177/245 |
| 2019/0147558 A1* | 5/2019 | Cheikh | B64F 1/368 |
| | | | 361/679.4 |

OTHER PUBLICATIONS

International Search Report and Written Opinion issued in International Application No. PCT/IB2018/053523, dated Jul. 31, 2018.

\* cited by examiner

ITEM HANDLING SYSTEM, METHOD AND APPARATUS THEREFOR

CROSS REFERENCE TO RELATED APPLICATIONS

This application is a national phase application of, and claims benefit of and priority to International Application No. PCT/EP2017/061100, filed May 9, 2017, entitled "Item Handling System, Method and Apparatus Therefor," which claims priority to Great Britain Application No. 1608205.9, filed May 10, 2016, entitled "Item Handling System, Method and Apparatus Therefor," the disclosures of which are incorporated herein by reference as if set forth herein in their entireties.

FIELD OF THE INVENTION

The present invention relates in general to an item handling method, system, and apparatus. More particularly, this invention relates to a baggage handling method, system, and apparatus such as a baggage handling method or system for use at a travel interchange or hub. Even more particularly, the present invention relates to an item handling system for use at an airport hub, rail or bus interchange, port or other travel interchange or termini. The present invention is particularly, but not exclusively concerned with a mobile drive unit for transportation of items such as baggage or other items at an airport hub or travel interchange.

BACKGROUND OF THE INVENTION

The volume of baggage being handled at airports has increased significantly in recent years and with this this growing volume of baggage, congestion at airports has increased, making it more and more difficult to navigate through the airport. This increased congestion also slows down the throughput of passengers from the airport entrance to the aircraft. This congestion and increasing queues at check-in counters may result in departure delays for airlines and may also impact the airport with additional costs and inefficiencies, as more staff are required to manage and coordinate passengers and their baggage.

A further problem with current baggage handling systems is that reduced mobility passengers also have to bring their baggage into the airport by themselves or with assistance from others.

Although curb-side check-in may be available at some airports where baggage can be dropped off outside the airport, the baggage still needs to be transported from the hotel, car park or other location to the bag check-in position.

Some self-service baggage solutions have been provided which accelerate the baggage drop process. These may allow a passenger, who has already checked in, to quickly drop their bags at the self-bag drop counter. However, a problem with such a solution is that the passenger still has to enter the airport with their baggage, which does not alleviate the problem of congestion within the airport caused by significant amounts of baggage and baggage trolleys.

SUMMARY OF THE INVENTION

The invention is defined in the appended claims to which reference should now be made. Embodiments of the invention seek to address the above problems by providing an improved item handling system and method therefor. In one aspect of the present invention a mobile drive unit or mobile drive apparatus (1001) for item handling is provided. The drive apparatus comprises at least one platform for supporting an item; a drive means; and a movable door coupled to the at least one platform and configured to move between an open position in which the platform is accessible to a user and a closed position in which the platform is enclosed. The apparatus further comprises control means coupled to the drive means. The control means are configured to control the drive means to move the drive apparatus from a current location associated with an item pickup point to a second different location for processing by an item handling hub, in response to receiving an indication that a token presented by the user is a valid token.

In another of the present invention a mobile drive unit or mobile drive apparatus (1001) for item handling is provided. The drive unit comprises a housing comprising a movable door (5001, 5003); a drive means; and a control means coupled to the drive means and to the at least one door wherein the control means is configured to control the drive means from a current location associated with an item pickup point to a second different location for processing by an item handling hub in response to the reading means reading a token presented by a user. In a further aspect of the present invention a mobile drive unit (1001) for item handling is provided. The drive unit comprises a housing; a movable door (5001, 5003) coupled to the housing; a drive means; reading means (3005); and a control means coupled to the drive means and to the at least one door wherein the control means is configured to control the drive means to move the drive unit from a current location associated with an item pickup point to a second different location for processing by an item handling hub in response to the reading means reading a token presented by a user.

Embodiments of the invention seek to reduce the large amount of baggage that is being manually transported by passengers, either by hand or on baggage trolleys, into and through the airport. Embodiments of the invention automate the transfer of baggage from the passenger directly to the Baggage Handling Systems or to a bag drop utility inside the airport using an autonomous baggage robot, in addition to facilitating the bag tag and drop process outside of the airport building.

Specifically, embodiments of the invention:

Reduce the amount of baggage that enters the airport. This, in turn, reduces the amount of baggage and baggage trolleys within the airport, including dining and retail areas and walk ways, making airport navigation easier.

Reduce queues at check-in counters and optimise the use of self-service check-in facilities, both online and within the airport.

Help streamline the support and assistance provided to passengers with reduced mobility and for the airport staff assigned to help these passengers.

Minimise the resources required for the maintenance and retrieval of baggage trolleys throughout the airport.

Reduce aircraft delays as passengers have more time to pass through security and boarding gates without having to handle their baggage resulting in easier navigation through the airport.

According to a first aspect of the present invention, a mobile or portable drive unit is provided. The unit may allow for bag tagging and bag drop off at any location, within a predetermined area, which is most convenient for the passenger or user.

BRIEF DESCRIPTION OF THE DRAWINGS

An embodiment of the invention will now be described, by way of example only, and with reference to the accompanying drawings, in which.

Figure 1:
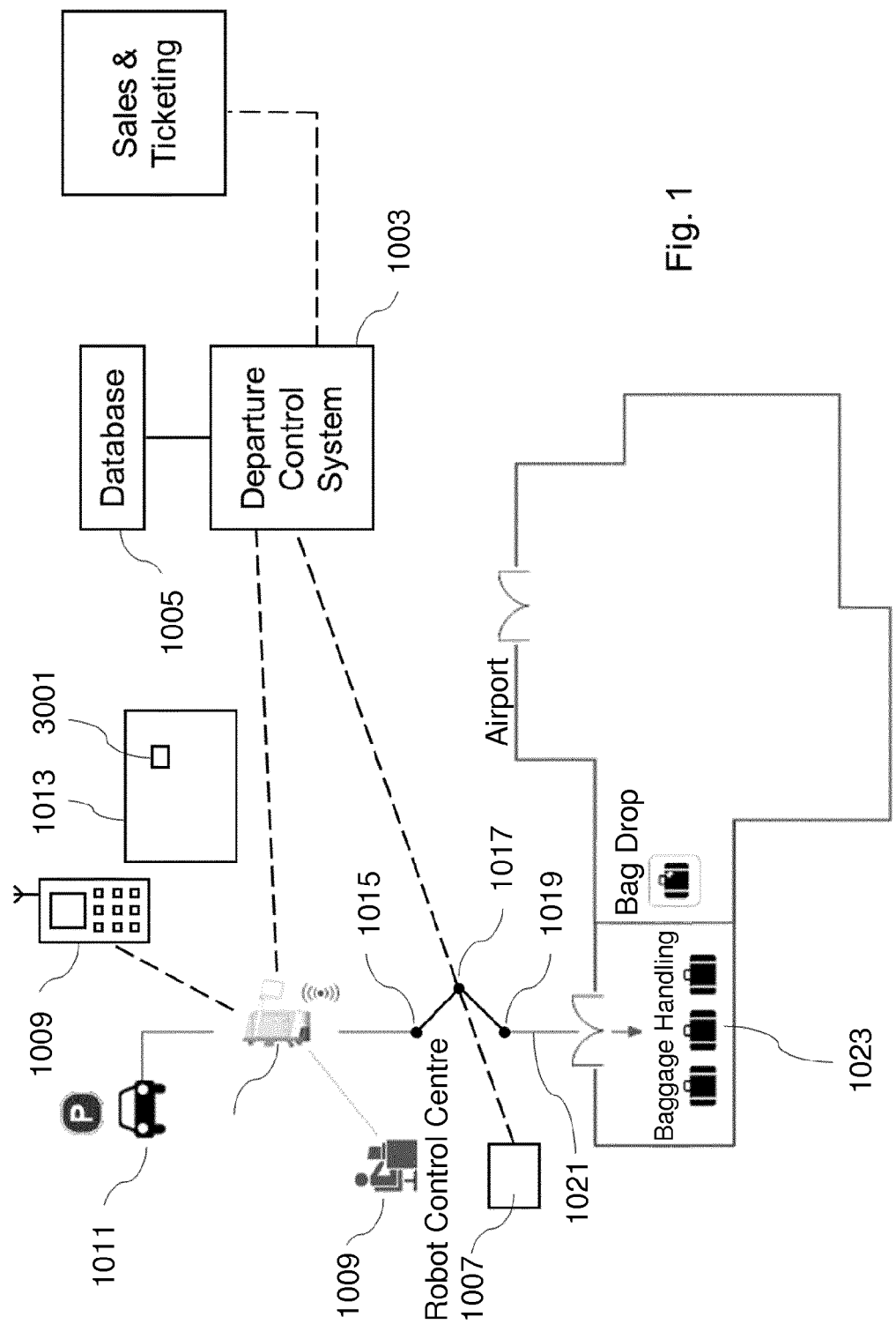
FIG. 1 is a schematic diagram showing the main functional components of a system embodying the invention as well as an exemplary route followed by a drive unit embodying the invention.

The following description is of a system, apparatus, and method of operation of a drive unit for use in the aviation industry, but this is exemplary and other applications of the invention will also be discussed. For example, embodiments of the invention find application in the travel industry in general for example rail, air, coach industries and the like.

Further, the system, apparatus and method embodying the invention may be used in any environment where a user transfer one or more items or bags at an interchange, hub or depot. For example, the method and system may find application in the mail, cargo, and parcel industries in addition to the handling of baggage at airports and other transportation hubs. Thus, the drive unit may transport any items be transported on behalf of passengers or shippers such as suitcases, cardboard boxes, wrapped objects and so on.

In the embodiments described below a mobile drive unit or mobile drive apparatus 1001 is provided for item handling. The drive apparatus comprises at least one platform for supporting an item; a drive means; and a movable door coupled to the at least one platform and configured to move between an open position in which the platform is accessible to a user and a closed position in which the platform is enclosed.

The apparatus further comprises control means coupled to the drive means. The control means are configured to control the drive means to move the drive apparatus from a current location associated with an item pickup point to a second different location for processing by an item handling hub, in response to receiving an indication that a token presented by the user is a valid token. In this way, the apparatus may transport an item of the user, such as an item of their luggage, along a predefined route directly in response to having determined that they have a valid token. For example, if the user is an airline passenger and the drive apparatus is located at or close to a specific airport, then the user may present a token in the form of a boarding pass for a flight they have booked to take from that airport, and the drive apparatus can be used to transport the user's luggage to a baggage handling hub, in response to having received an indication that the presented boarding pass is valid.

As described below in respect of FIGS. 1 to 14, there are a number of ways in which the control means can receive an indication that a token presented by the user is a valid token. For example, as described in respect of FIG. 5, the drive apparatus may comprise an interface unit 3001 that can extract data from a token presented by a user. The extracted data can be compared with stored data and a determination can be made as to whether or not the token is a valid token. The determination may be based on one or more matches being identified between the extracted data and the stored data. The stored data may be data stored on the mobile drive apparatus 1001. Alternatively or additionally, the mobile drive apparatus may be communicatively coupled with a remote computer or server, such as a departure control system, and the stored data may reside on said computer or server. The coupling may be via a wired or wireless communication means. In this latter case, the mobile drive apparatus 1001 may send the extracted data to the computer or server, so that the computer or server may perform the determination and send the mobile drive apparatus a communication indicating whether or not the token has been determined to be a valid token.

Figure 5:
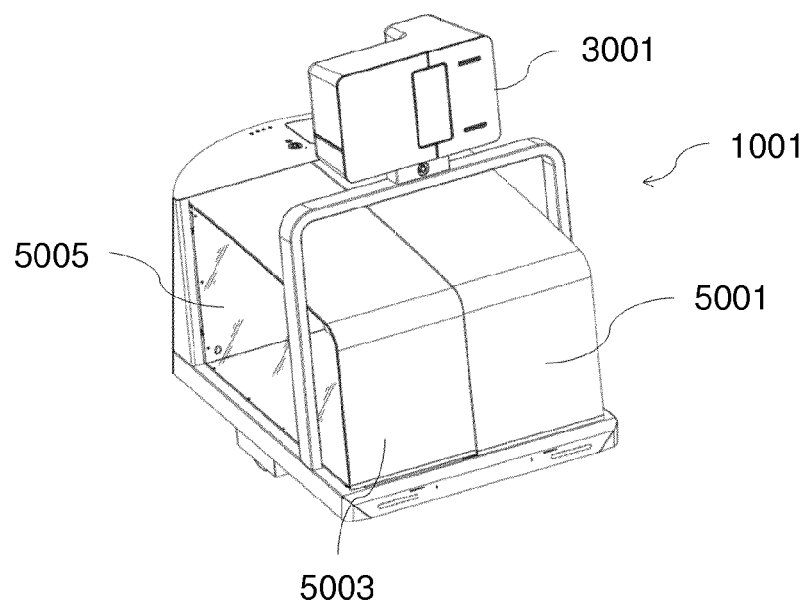
FIG. 5 is a perspective view of a rear view of a drive unit embodying the invention and an outline front view of the scanning unit.
Figure 6:
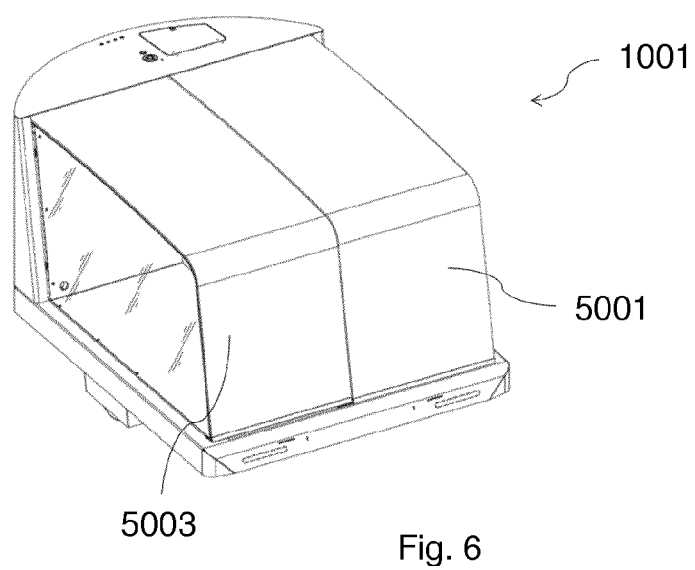
FIG. 6 is a perspective view of a rear view of a drive unit embodying the invention without the user interface unit.

FIG. 6 depicts an alternative embodiment to that which is described below in respect of FIG. 5. In particular, as described below in respect of FIG. 6, the mobile drive apparatus may be communicatively coupled to a kiosk. The kiosk may comprise a user interface unit that can extract data from a token presented by a user. In this case, the mobile drive apparatus may not comprise a user interface unit. Consequently, in the FIG. 6 embodiment, the mobile drive apparatus may receive an indication that a token presented by the user is a valid token, by way of receiving a communication from the kiosk indicating that the token has been authenticated or determined to be a valid token. The kiosk may perform the determination by comparing data extracted from token with data stored at the kiosk. Alternatively, the kiosk may be in wired or wireless communication with a computer or server, such as a departure control system, and the stored data may reside on said computer or server. In this case, the determination may be performed at said computer or server.

As noted above, a determination can be made as to whether or not the token is a valid token, by comparing data extracted from the token presented by the user with stored data. The determination may be based on one or more matches being identified between the extracted data and the stored data. The extracted data and/or the stored data may contain data in at least one of the following fields: a format code, number of legs encoded, passenger name, electronic ticket indicator, operating carrier PNR code, from city airport code, to city airport code, operating carrier designator, flight number date of flight, compartment code, seat number, checkin sequence number, passenger status, marketing carrier field, sequence number field, a class name, a ticket type name, (such as electronic or paper), boarding time, boarding gate number. This data may be decoded into an alpha numeric format.

Figure 2:
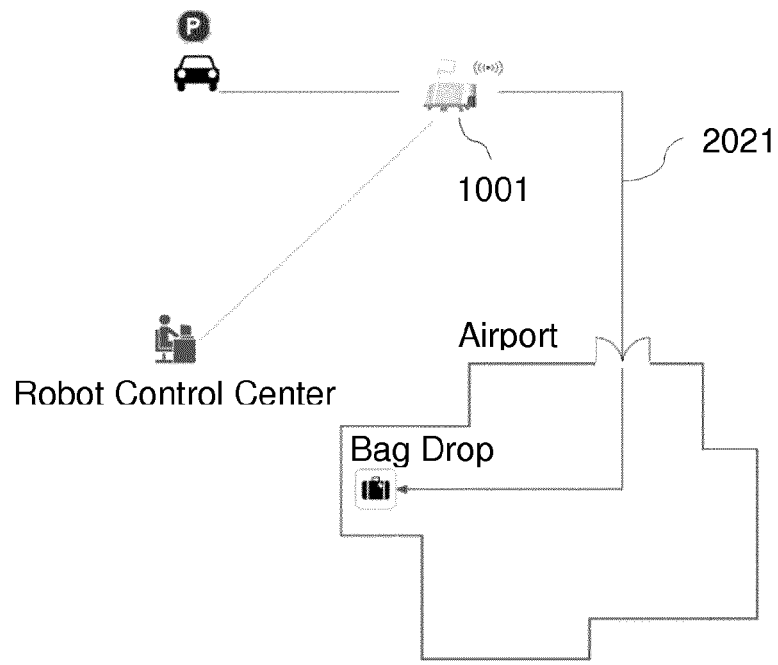
FIG. 2 is a schematic diagram also showing the main functional components of a system embodying the invention including an alternative exemplary route followed by the drive unit embodying the invention
Figure 3:
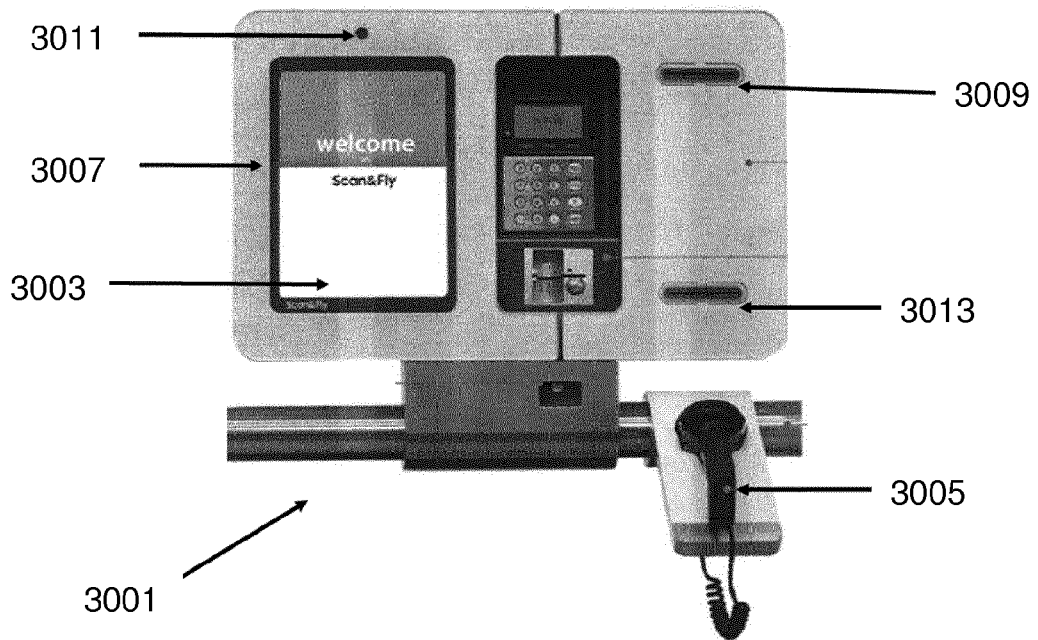
FIG. 3 is a perspective view of the front of a user interface or scanning unit embodying the invention.

Referring now to FIGS. 1 to 3 of the drawings, the system may comprise a drive unit or robot, 1001 and a scanning unit or user interface unit 3001. Usually, each of the drive unit 1001 and user interface comprise a separate processor configured to control the drive unit and user interface respectively. For example, the user interface 3001 may comprise a fanless processor. The user interface unit processor may be located inside a housing of the interface unit 3001. Similarly, a separate processor may be located within the drive unit. Usually, the drive unit processor is located within a housing towards a front end of the drive unit in close proximity to housing or hatch 8001. However, a single processor may be provided which may perform the functions of the drive unit processor or/and user interface unit processor.

As best illustrated in FIG. 5 of the accompanying drawings, usually the drive unit 1001 comprises an integral user interface unit 3001. However, having a drive unit 1001 with integral user interface is optional, and a physically separate user interface unit 3001 may be provided, separate from the drive unit. Such a drive unit is illustrated in FIG. 6 of the drawings and shows an exemplary drive unit 1001 without user interface unit. In this example, a separate user interface unit may be provided as part of a kiosk, for example, which is communicatively coupled to one or more drive units 1001 via wireless or wired communication protocols.

Further, in the embodiment shown in FIG. 5, each of the outermost side panels 5005 is transparent so that the interior of each of the hold compartments 7001, and their contents, if any, may be seen from the outside.

The user interface 3001 unit may comprise a wireless communication means such as a transmitter and receiver which allows the user interface unit 3001 to communicate with any one or more of a departure control system 1003, the drive unit 1001, and a central server 1007, portable communication device 1009 or other remote system.

In one specific exemplary implementation, communication between the drive unit 1001 or platform and the user interface unit 3001 may be performed by means of wired 24V inputs or/and outputs.

The following input and output control signals may be defined.

From User Interface to Drive Unit
A control signal having a value of "1" may indicate that the user interface is active (as a response to activating the interface unit). A control signal having a value of "0" may indicate that the user interface is inactive.

A second control signal of "1" may relate to a command originating from the user interface which instructs the drive unit or platform to open one of the doors. A value of 0 may relate to a command originating from the user interface which instructs the drive unit or platform to close one of the doors. Two different control signals may be provided to allow independent control of the two doors.

A "HeartBeat" control signal may be defined which concerns continuous communication between user interface and drive unit.

From Drive Unit to the User Interface
A fourth control signal of "1" may relate to a command originating from the drive unit instructing the user interface to activate. A "0" value may be used by the drive unit to acknowledge that the user interface is inactive (message S&FlsActive).

A fifth control signal of "1" may be used to indicate whether Luggage is on the platform. A value of "1" indicates that luggage is on the platform. A value of 0 indicates that no luggage is on the platform or drive unit. Alternatively or in addition to the fifth control signal, a signal may be provided to communicate the weight of the item on the platform. This signal may be an analogue or digital signal.

A sixth control signal may have a value of 1 which indicates that one of the doors is open. A value of 0 indicates that the door is closed.

A seventh control signal may indicate whether the platform or drive unit is operational. A value of 0 indicates an error and that the drive unit is not operational. An eighth control signal may relate to a "HeartBeat" continuous communication between the drive unit and the user interface.

In the heartbeat mode of continuous communication between the drive unit and the user interface, each device regularly switches a signal, which is read by the second device. If the second device does not read any change before a timeout, then the communication is considered wrong and an error is raised. The switching period may be 50 ms and the timeout may be 500 ms.

Referring once again to the schematic diagram of FIG. 1, the departure control system, DCS 1003 may optionally comprise a local or remotely stored database 1005. Usually, the departure control system resides on a computer or server which is communicatively coupled, via wired or wireless communication means, such as a transmitter or receiver, to the drive unit 1001. Alternatively, or in addition, the departure control system may be communicatively coupled to a central server or computer 1007 which may be communicatively coupled to the drive unit 1001 as well as one or more additional drive units, not shown in FIG. 1. In any event, the departure control system may also be communicatively coupled to a ticketing or/and sales control system which controls the sale of tickets.

The database 1005 may be stored on a writeable or rewriteable storage medium such as hard disk or solid state storage means such as flash drive, ROM, RAM, or other storage means which will be known to the skilled person, such as cloud storage. The database usually comprises passenger data associated with a passenger who has previously booked or made a reservation for a ticket for travel on a particular scheduled flight operated by an airline. Such departure control systems and ticketing/sales control systems are well known to the skilled person, and therefore will not be described in further detail. The DCS may comprise a server or computer hardware coupled to the storage medium.

The drive unit 1001 or/and user interface unit 3001 may comprise computer hardware or software which when executed undertakes one or more predetermined method steps, which will be described in further detail with reference to FIGS. 4a and b of the drawings. The software may comprise one or more modules which may be communicatively coupled to the central server 1007 for example via a bus or via other wired or wireless communication means.

The central server 1007, which may be coupled to a control center 1009 may comprise one or more of an application programming interface, API, 105. The API may be configured to provide one or more modules for central management of a fleet of drive units. A control module may be provided which allows an operator to monitor the current location of the drive unit. The control unit may also be configured to change a route followed by the drive unit if needed. Further, faults occurring on a drive unit which prevent it from performing a task may be transmitted to the server 1009 or/and to the control center 1009. Similarly, any damage or errors associated with a drive unit may be transmitted to the central server 1007 or/and control center 1009.

The system may further comprise a portable or mobile communication device, or other user device 1009 such as mobile telephone, tablet, laptop, or other communication device which may communicate with the server 1007 or directly with a drive unit 1001 using wired or wireless communication protocols (for example using Wi-Fi®, third generation (3-G) or fourth generation (4-G) wireless protocols) which will be known to the skilled person. Usually, the communication device 1009 is associated with the passenger who has made a reservation for a ticket for a journey between an origin and destination.

The system may further comprise a control center console 1009, which may comprise computer hardware or software or both. The console 1009 is usually operated airport management services and allows the airport to manage beacons within a particular area or airport. However, individual airlines may also operate the control console.

The web console 1009 usually resides on a separate computer or server, but in principle may be part of central server 1007. The web console 1009 may comprise software or hardware which when executed may perform one or more of the method steps described with particular reference to the control center. The web console may be communicatively coupled to the server 1007 and in particular to the departure control system 1003.

Referring now to the flow diagrams of FIGS. 4*a* and 4*b* of the drawings, the main steps performed by two embodiments of the invention will now be described. This assumes that a passenger has arrived at a parking lot 1011 or other item drop off location. This may be close to a predetermined region 1013 within an airport precinct or drive unit 1001 base station, which may be within the airport building or external to the airport building. The base station may include facilities for battery charging in addition to a wired or wireless connectivity for software or map updates, or other connections, but these are of course optional. The drive unit usually resides at a base station in a wait mode in which it is able to receive wired or wireless communications from external systems, such as the user interface unit 3001 or the central server 1007, or mobile communication device 1009.

At step 4001, a passenger may optionally summon the drive unit 1001 to their current location using separate kiosk or user interface unit 3001. Alternatively, this step may be performed by a user launching an application on the mobile device 1009. The application and/or kiosk may use wireless communication protocols (such as Bluetooth or Wi-Fi) to communicate directly with one or more drive units in the vicinity of the passenger or may communicate with one or more drive units via the central server 1007. In the latter case, the central server communicates with drive unit. The application or kiosk may communicate location data defining the location of the mobile communication device, determined for example using GPS. Other methods of locating the mobile communication device will be known to the skilled person. For example, the device may use triangulation to determine its current location. The device may store a predetermined list of areas or airports which are equipped with one or more drive unit base stations along with an associated location for each area or airport equipped with the one or more base stations.

In response to receiving the location of the user, the central server or user interface unit 3001 compares the location of the drive unit to a database comprising data defining the location of one or more drive units. Based on the comparison, a drive unit which is closest to the passenger proceeds to the current location of the mobile device 1009.

Alternatively at step 4001, the passenger may approach the predetermined location or drive unit base station 1013 where one or more drive units reside in a wait mode.

In either case, the passenger may optionally touch a touch screen 3003 associated with the user interface 3001 to start the bag or item handling process. Alternatively, the user interface unit 3001 may be provided with a proximity sensor such as a passive infra-red, PIR, sensor to detect an approaching passenger. In one example, the robot may wait in a wait mode with one of the doors 5001, 5003 in the open position without the need to detect the present of a passenger with the PIR sensor.

In any event, at step 4003, one of the processors, such as the drive unit processor or the user interface unit processor sends an activation signal to open one of the doors 5001, 5003. This may be performed using one of the door actuators or motors 12013 or 12015, described in further detail below.

The user interface unit 3001 may then optionally display on the touch screen an invitation for a passenger to place a bag in one of the hold compartments 7001, 7003. This may be in response to the processor receiving a control signal confirming that one of the doors has been opened.

The passenger may then place an item in one of the hold compartments 7001, 7002. The drive unit processor or user interface unit processor may then detect, at step 4005 that an item has been placed in one of the hold compartments. This may be performed using a weighing sensor or means, such as for example, a piezoelectric weight sensor. Thus, the unit may detect that a bag has been placed in a hold compartment. An optional further check may be performed to determine the weight of the bag and whether this exceeds a predetermined threshold.

In response to the unit detecting that an item has been place in one of the hold compartments 7001, 7002, the user interface unit 1001 may display on the screen 3003 an invitation for a user to scan a token. Usually, the token is a boarding pass or bag tag associated with a passenger who has booked a flight on an airline carrier.

The passenger then scans the token. At step 4007, an optional check may be performed to determine whether the token is valid. This optional validation step is described in further detail with reference to the flow diagram of FIG. 4*b* of the drawings. In one example, the user interface unit processor may compare data encoded in the token with stored departure control data, such as PNR data, which may be stored locally on the drive unit or scanning unit or alternatively may be remotely stored on a remote departure control system.

At step 4009, in response to the user scanning the token, a bag tag is printed using the bag tag printer 3009. Usually, an additional check is performed to determine whether or not the bag tag should be printed. The additional check is also described with reference to FIG. 4*b* of the drawings. Once the bag tag has been printed, the user interface may display an invitation for the passenger to affix the bag tag to the item placed in one of the hold compartments 7001, 7003. The user may then subsequently interact with the touch screen 3003 of the user interface unit to confirm that the passenger has attached the bag tag to the item.

At step 4011, in response to the user confirming that the bag tag has been attached, the drive unit processor or user interface unit processor sends a control signal to one of the door actuators or motors 12013 or 12015 to close the door.

At step 4013, a receipt is printed by the bag tag printer 3013. Subsequently, the drive unit navigates to a predetermined baggage handling location, at step 4015. This may be performed using the ANT® navigation system, as well as using the motors 11003, 11005, and is described in further detail with reference to the flow diagram of FIG. 4b.

Finally, at step 4017, one or more of the doors are opened by the drive unit processor upon reaching the predetermined baggage handling location. This may be done in response to one of the processors determining that the drive unit has indeed arrived at the predetermined location. The one or more doors may be opened in a similar way to that described with reference to step 4003. The drive unit may then subsequently return to the starting point.

Referring now to the flow diagram of FIG. 4b of the drawings, the main steps performed by a further embodiment of the invention will now be described.

As previously described with reference to the flow diagram of FIG. 4a, at step 4001, a passenger may optionally summon the drive unit 1001 to their current location using separate kiosk or user interface unit 3001 or alternatively at step 4001, the passenger may approach the predetermined location or drive unit base station 1013 where one or more drive units reside in a wait mode.

In either case, the passenger may optionally touch a touch screen 3003 associated with the user interface 3001 to start the bag or item handling process. Alternatively, the user interface unit 3001 may be provided with a proximity sensor such as a passive infra-red, PIR, sensor to detect an approaching passenger. In one example, the robot may wait in a wait mode with one of the doors 5001, 5003 in the open position without the need to detect the present of a passenger with the PIR sensor.

In any event, the passenger may scan a token such as boarding pass or bag tag using the scanning unit 3005. Thus, the scanning unit reads a token presented by the user, at step 4103. This step may be performed in response to the user interacting with the user interface unit, for example, by touching the touch screen. Further, the user interface may display an invitation to a passenger or user to scan the token.

Usually, the scanner is 3005 is configured to read a 2-dimensional or 3 dimensional barcode associated with the boarding pass or bag tag. However, the scanner may be configured to recognise Alpha numeric characters using an Optical Character Recognition, OCR algorithm which will be known to the skilled person.

The token may be a paper token such as a printed boarding pass or bag tag. However, it will be appreciated that any token, such as an electronic boarding pass encoded with data defining a passenger and optionally one or more of a flight number, departure airport, arrival airport, departure date, and departure time may be read.

At step 4105, a determination is made as to whether the passenger has presented a boarding pass or bag tag. The user interface unit may distinguish between the bag tag and the boarding pass based on the format data encoded within the token. For example, the user interface unit may distinguish between the boarding pass and bag tag based on the format of the barcoded data. For example, a Bag Tag usually comprises a 1-dimentional bar code. For example the bar code may be a 1 dimensional 2-out-of-5 interleaved, 10-digit bar code as defined in an IATA PSCRM resolution 740. A boarding pass usually comprises a 2-dimensional bar code. For example, a boarding pass may include a pdf417 (2D) barcode (for printed boarding passes) or QR code/Aztec/Datamatrix code as defined in IATA PSCRM resolution 792.

If the user interface unit determines that a passenger has presented a bag tag, then the user interface unit may decode that information within the bag tag, and this information is usually in the form of a bar code. The data encoded in the bar code which may be printed the bag tag may comprise a 10-digit License Plate Code, LPC. The license plate code may be used to query the DCS in order to retrieve the passenger name record data, PNR data. The data may comprise any one or more of a passenger name, flight number, destination airport code, arrival airport code, and may be stored in the DCS. Thus, a validation step may be performed to check that the bag tag presented by the passenger is a valid bag tag.

Usually, the PNR data retrieved by the user interface unit comprises a passenger name, ticket number, itinerary and so on. However, the data retrieved may depend on the interface offered by the DCS although usually the data comprise a complete PNR which contain all the information relevant to the handling of the passenger and related bags.

Alternatively, if the user interface unit determines at step 4105 that the user has presented a boarding pass, the information encoded within the boarding pass may then be decoded.

Regarding the data which is read from the boarding pass when it is decoded by the user interface unit, usually the user interface unit may read the complete boarding pass string as defined by the IATA standard outlined above.

For example, the unit may read any one or more of the following fields: a format code, number of legs encoded, passenger name, electronic ticket indicator, operating carrier PNR code, from city airport code, to city airport code, operating carrier designator, flight number date of flight, compartment code, seat number, checkin sequence number, passenger status, marketing carrier field, sequence number field, a class name, a ticket type name, (such as electronic or paper), boarding time, boarding gate number. This data may be decoded into an alpha numeric format.

Any of this information may be optionally verified against the PNR information. The eligibility check based on departure airport code may be performed at an early stage of the bag drop process (even before communication with the DCS takes place) to check that the passenger is eligible to drop a bag at the drive unit.

Any one or more of these decoded fields may be compared to corresponding data stored in the airline DCS to validate it or confirm that there is a match, and thus determine whether or not the boarding pass is valid.

Of course, the user interface unit may be optionally configured according to airline preferences to optionally perform the above comparison.

In one example, the user interface unit requests the same data from the DCS irrespective of whether a user presents a bag tag or boarding pass is presented. In other words, the response to the Passenger Identify call is identical.

Thus, passenger data may be retrieved by using the data in the (boarding pass) barcode to lookup the passenger in the DCS.

In order to compare the data in the barcode to lookup the passenger in the DCS, some departure control systems may only need to use any one or more of date, booking reference (or PNR record locator) and passenger name data. Other departure control systems may require more information or allow other types of PNR searches (e.g. by checking for LPC or combination of flight number, seat number and flight date.

In addition to distinguishing between the type of document or token presented by a user, the user interface unit may distinguish between a 1-stop process (where a bag tag is printed at the user interface unit or bag drop) or a 2-stop process (where pre-tagged bags are accepted and the unit does not print a bag tag).

Regarding the 2-stop mode, the user interface unit software determines whether to print a bag tag or not by looking for existing, or in other words 'inactive' bag tags in the Passenger Name Record which it retrieves from the airline host (DCS). If inactive tags are found, the user interface unit does not print a new tag. Thus, in the 2-stop mode, usually an agent will have pre-printed a bag tag or a user may have previously printed the bag tag at a kiosk. In this mode, a passenger scans with the handheld scanner a pre-printed bag tag and then the unit verifies that the scanned bag tag number is present in the passenger data in the DCS. If the bag tag number cannot be matched to the passenger, or the bag tag has already been activated, the unit may abort the bag drop process by providing a suitable message to the user.

In the 1-stop mode, if the user interface unit determines that no tags or only active tags are stored in the associated PNR. The user interface unit then requests the DCS system to assign a bag tag number which is communicated back to the user interface via wired or wireless communication protocols, and the bag tag printer 3009 prints the bag tag, at step 4107. Usually, the bag tag printer a one dimensional bar code. The code may comprise a 10-digit License Plate Code, LPC.

Thus the 1-stop mode may be favored by a passenger since it allows for a simpler process by the passenger, without the need to print a bag tag before depositing an item at the drive unit. One advantage of the user interface unit is that it can distinguish between bag tag and boarding pass and determine whether or not to print a bag tag. Further, if the user interface unit determines that a boarding pass has been scanned, a further determination of whether or not to print a bag tag may be made by wirelessly querying a departure control system to determine a bag tag status stored in the departure control system.

In either case, the user interface unit 3001 communicates with the departure control system via the wired or wireless communication means to look up data defining the passenger, such as the passenger name, in the departure control system 1003. Thus, a comparison is made between the passenger data read from the token and the passenger data stored in the DCS database. Usually, a name comparison is performed, but if multiple matches are found in the DCS database, an additional comparison between the departure date and time, and the current date and time may be performed to find a unique match between the data encoded within the token and the data stored in the departure control system.

Subsequently, the processor coupled to the user interface unit 3001 receives, usually via a wireless communication means, the passenger data retrieved from the departure control system 1003, such any one or more of the passenger's name, flight number, and baggage allowance.

At this stage, the processor coupled to the user interface unit may additionally request a passenger identity document, such as a passport or identity card to be presented and read by the scanning unit or reader 3005. This has the additional benefit that items may only be processed if the data held in the departure control system or/and the data read from the presented token (e.g. boarding pass or bag tag) matches the data encoded in the identity document. This information may be encoded in a machine readable zone, MRZ of a passport or identity document, and optionally may be encoded in a chip embedded in the user identity document. The data encoded in the chip may be read using a wireless communication protocol, such as near field communication, NFC which will be known to the skilled person.

In this way, the name on the identity document may be compared with the name data in the passenger data retrieved from the departure control system or/and the data read from the token presented by the passenger.

The user interface unit may comprise an optional printer 3013 for the printing of a claim tag including bag tag data which may be used in the event that an item is lost. The user interface unit 3001 may also comprise an optional payment terminal in for processing any payments in the event that baggage fees are due.

At this stage, a further optional security step may be performed by taking an image of the passenger with the camera 3011. The user interface unit processor 3007 may compare the image of the user with biometric data stored on the passport. Thus, item processing may only proceed if the user interface unit processor determines that the image of the user matches the biometric data stored in the passport. The user interface unit processor 3007 may use known image comparison algorithms to compare key features of the two images which may be determined using a scale invariant feature transform, although other algorithms will be known to the skilled person.

If the token provided by the passenger matches the data stored in the departure control system, the user interface unit processor 3007 may send a control signal to the drive unit processor to open one or more of the drive unit doors 5003, at step 4109, as previously described.

Figure 7:
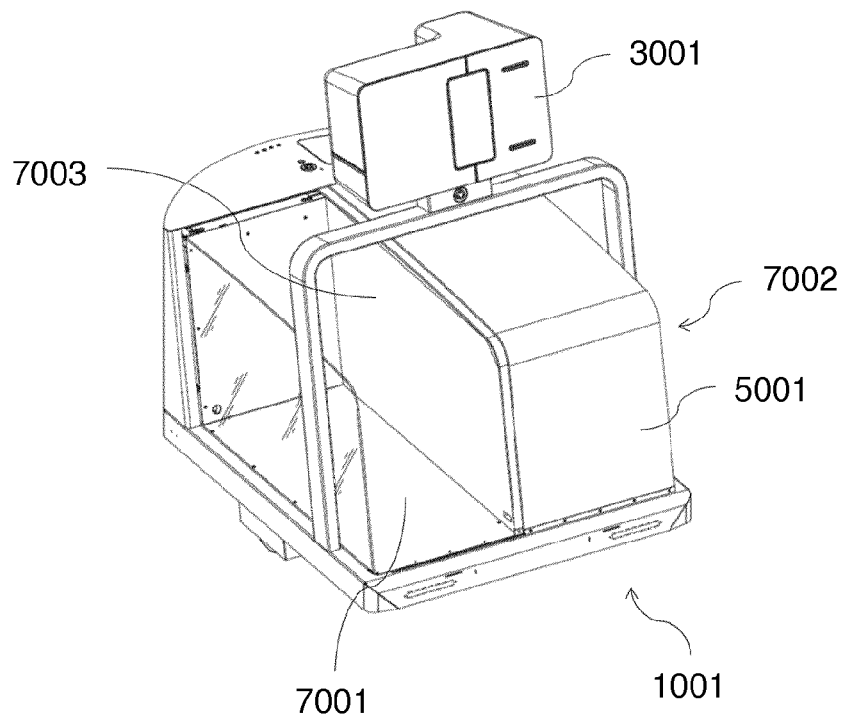
FIG. 7 is a perspective view of a rear view of a drive unit embodying the invention with one of the doors in a retracted or open position.

Further details of the door mechanisms as well as their controllers and associated control processor will be described with reference to FIGS. 5 to 13 of the drawings. FIG. 7 of the drawings shows a perspective view of the drive unit with one of the doors open. In this configuration one door is retracted so that it is positioned under the other door.

The passenger then places the luggage or bag in the hold compartment 7001 of the drive unit 1001, shown in FIG. 7 of the drawings, after attaching the bag tag, if necessary. The drive unit may hold at least 2 pieces of standard luggage of dimensions 800 mm\*500 mm\*400 mm. It will be noted that in the exemplary drive unit 1001 shown in FIG. 7 that two separate hold compartments 7001, 7002 are provided and each separate hold compartment 7001, 7002 is separated by a wall or partition 7003.

Each movable door of the drive apparatus is coupled to a respective platform and configured to move between an open position in which the respective platform is accessible to a user and a closed position in which the respective platform is enclosed. Each movable door and its corresponding platform thus help to form an enclosed compartment for storing one or more items, such as one or more bags of luggage, of a user. The one or more enclosed compartments may be formed solely of a platform and a respective movable door. Alternatively, the one or more enclosed compartments may be formed by other components of the drive apparatus, such as one or more walls or partitions.

One particular benefit of the sliding door arrangement shown in FIG. 7 of the drawings is that, in principle, any number of separate or isolated hold compartments may be provided and that each compartment may be easily accessible by the passenger.

Thus, a drive unit 1001 comprising 3 or more hold compartments may be provided wherein each of the outermost two compartments is each adjacent to a different first and second partition, and wherein the innermost hold compartment is adjacent to the first and second partitions. In the embodiment shown in FIGS. 5 to 9 of the drawings each door is I-shaped in section, so that a first planar portion of the door extends to cover one face (such as the top face or substantially horizontal face) of the drive unit and a second planar portion extends to cover a second different face (such as a side face or substantially vertical face) of the drive unit. Thus, having a door comprising first and second planar portions arranged to extend in different planes means that the drive unit has easily accessible hold compartments. In one specific example, the first and second planar portions are approximately perpendicular to one another.

Further, each hold compartment may be associated with a door which corresponds to the opening size of each partition. The processor associated with the drive unit 1001 may be configured to independently control each of the doors between an open position in which the door is retracted below or above another door so that the hold compartment is accessible by a passenger to position a piece of luggage in the hold compartment and a closed position in which the hold compartment is not accessible from the exterior of the drive unit by a passenger or other person.

The passenger may then confirm, using the user interface unit 3001, that the bag is correctly positioned within the hold compartment and that the door 5003 may be moved from the open position to the closed position, at step 4111, and as shown in FIG. 5.

Either before or after the door is closed, the drive unit processor may detect, using a weighing sensor, such as for example, a piezoelectric weight sensor, that a bag has been placed in a hold compartment and a further check may be performed to determine the weight of the bag and whether this exceeds a predetermined threshold.

An optional receipt may be printed for the passenger with printer 3013.

At step 4113, the drive unit processor determines the location of the drive unit. This may be performed, for example using GPS or by triangulation of wireless communication signals. Further, the robot may navigate using the laser scanners which detects features or obstacles and navigates around them.

The processor then compares the location to one or more waypoints 1015, 1017, 1019 associated with a predetermined route 1021 from the base station to the baggage handling location 1023. Usually, the drive unit processor selects the waypoint closest to the current location and determines the drive vector (i.e. direction and distance) to that location. The drive unit then moves to the closest waypoint at step 4115. Once at the one of the waypoint, the drive unit then controls the differential drive mechanism (for example the motors, described in further detail with reference to FIGS. 10 to 12 of the drawings) so that the drive unit follow the predetermined course or route 4017 based on a comparison of the current know drive unit location and the location of the waypoints making up the predetermined route.

The drive unit may be provided with an ANT® navigation unit. This allows the processor to determine a position or location of the drive unit, and to control the movement of the drive unit along one or more predetermined virtual paths. Such a navigation units are available from BlueBotics SA, of Jordils 41B, CH-1025, St-Sulpice, Switzerland.

In one example, each drive unit 1001 may comprise a memory (such as a ROM, RAM, or flash memory for example) for storing a plurality of predetermined, different routes or paths.

Each of the plurality of predetermined paths may share a common origin or/and destination. For example, as shown in FIG. 2 of the drawings, the two different predetermined training paths 1021, 2021 share a common origin (i.e. the start of each paths are associated with the same location) but each route or path is defined by one or more different waypoints. This may have the benefit that if an obstruction is detected by laser scanners 10001 or 10003 in the selected path, that an alternative path may be selected to avoid the obstruction while still arriving at the destination. An OMRON™ laser scanner may be used for object detection/localization such as model OS 32C-SP1.

At step 4019, once the drive unit has arrived at the destination, an operator may open one or more of the doors. In one example, a lockable hatch 8001 is provided which is accessible with a key by authorised baggage handling operators, and one of the doors may be opened by a door control switch. Alternatively, the drive unit or user interface unit processor may detect whether the drive unit has arrived at the predetermined location and only open one or more of the doors if the processor determines that the drive unit has arrived at the predetermined destination.

Figure 8:
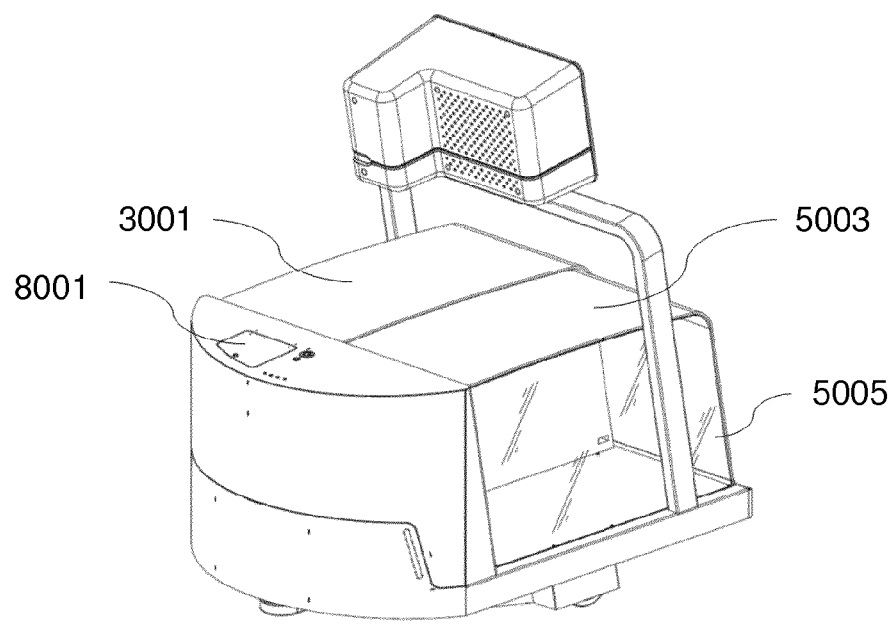
FIG. 8 is a perspective front view of the drive unit and a rear view of the user interface unit.
Figure 9:
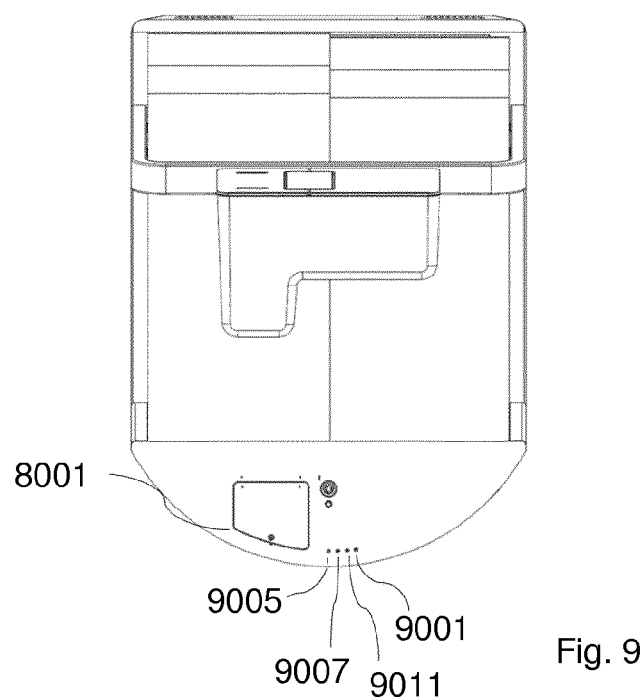
FIG. 9 is a plan view of the drive unit from above

As shown in FIGS. 8 and 9 of the drawings, the drive unit may comprise one or more buttons or/and indicators.

A red emergency stop button 9001 may be provided at the front of the drive unit. Further, an additional pushbutton 9003 located underneath may be provided which provides the function of resetting the drive unit after the emergency button has been pressed and released. 4 indicators may also be provided. A first indicator 9005 is a battery indicator which, when illuminated indicates that the battery level is too low. A second indicator 9007 provides an indication of whether the navigation system is correctly functioning. For example if the ANT® navigation system is not functioning correctly for example because the platform is lost, a communication error with the motor drive has occurred, then this indicator may be illuminated. A third indicator 9009 may be provided which indicates whether the emergency button has been pressed or whether an obstacle detected in the safety zone of the laser scanner A fourth indicator 9011 may be provided which, when illuminated, provides a power indication of when the platform is powered on.

A maintenance interface may also be provided, under the hatch 8001. The interface may include an Ethernet configuration port, as switch to control manual control of opening and closing of the left door 5001, a switch for manually controlling movement of the platform when pressed, a switch for manual control of the opening and closing of the right door 5003, and a main power switch.

Once an operator has unloaded the luggage, the drive unit processor closes the door. This may be in response to the processor detecting, using the weight sensor, that a bag has been removed from one or both of the hold compartments 7001, 7003. The drive unit processor may then control the motors, described in further detail with reference to FIGS. 10 to 12 of the drawings, so that the unit follows the predetermined route back to the base station to await further bag drop.

Further functional aspects of the drive unit will now be described with reference to FIGS. 10 to 14 of the drawings.

Figure 10:
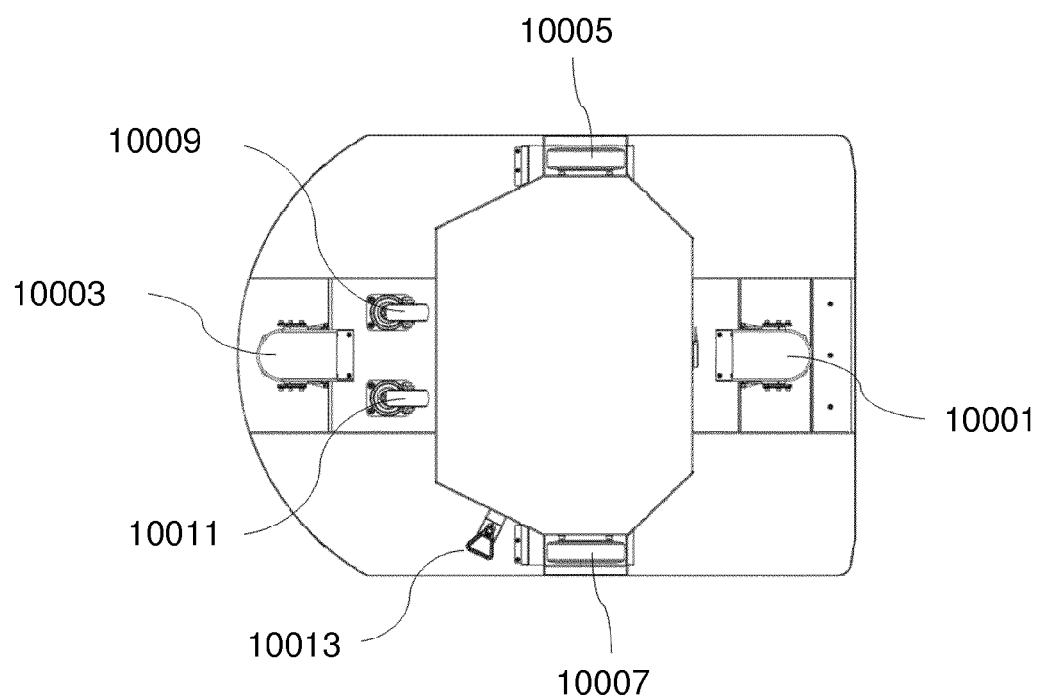
FIG. 10 is a view of the underside of the drive unit.

As best illustrated by FIG. 10, the drive unit comprises 2 driving wheels 10005, 10007, which are positioned approximately in the centre of the drive unit 1001 measured in a longitudinal direction from the front to the rear of the robot in the direction of travel. A first motor 11003 coupled to the first wheel 10005 and a second motor is coupled to 11005 is coupled to the second wheel 11007. The drive unit may also comprise an extendible charging cable 10013 which may extend from the drive unit to a power source.

Figure 11:
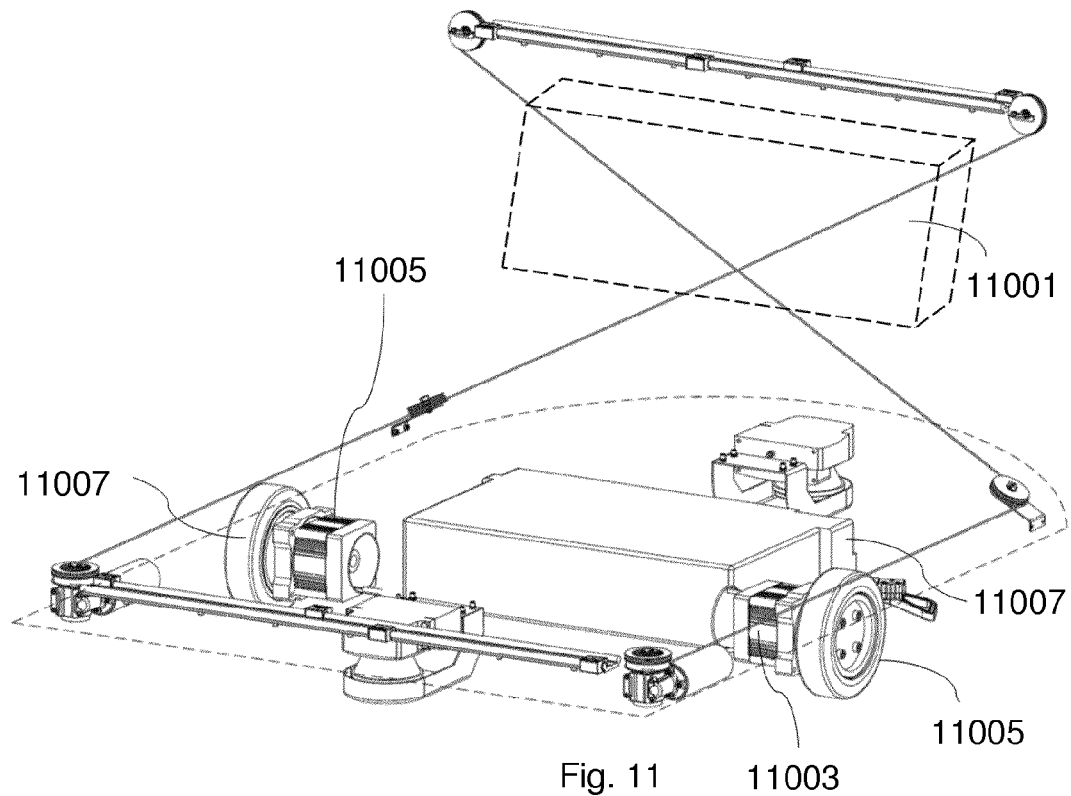
FIG. 11 is a view of the rear of the drive unit with some of the exterior housing removed showing some selected internal components of the drive unit.

The drive unit comprises at least one battery unit and preferably, a split battery arrangement is provided. As best illustrated by FIG. 11 a first battery 11001 may be positioned a few centimetres in front of the axis of rotation of each wheel, towards the centre of the schematic base plate 11007 shown in FIG. 11. The battery or cell may be a 24 Volt, 177 Ah cell and may have a weight of about 60 kg each. This may provide between 4 and 12 hours of operation without charging dependent upon use.

The first battery 11001 is usually positioned so that it approximately lies in the same plane as each wheel 10005, 10007, and each associated drive motor 11003, 11005. The drive motors 11003, 11005 may form a differential drive unit which may be controlled by the processor associated with the drive unit (not shown in the drawings). A second battery 11009 may be positioned towards the front of the drive unit, as best illustrated in FIG. 11. The split battery arrangement means that the drive unit is substantially equally balanced around the pivot axis of the two wheels 10005, 10007.

Figure 12:
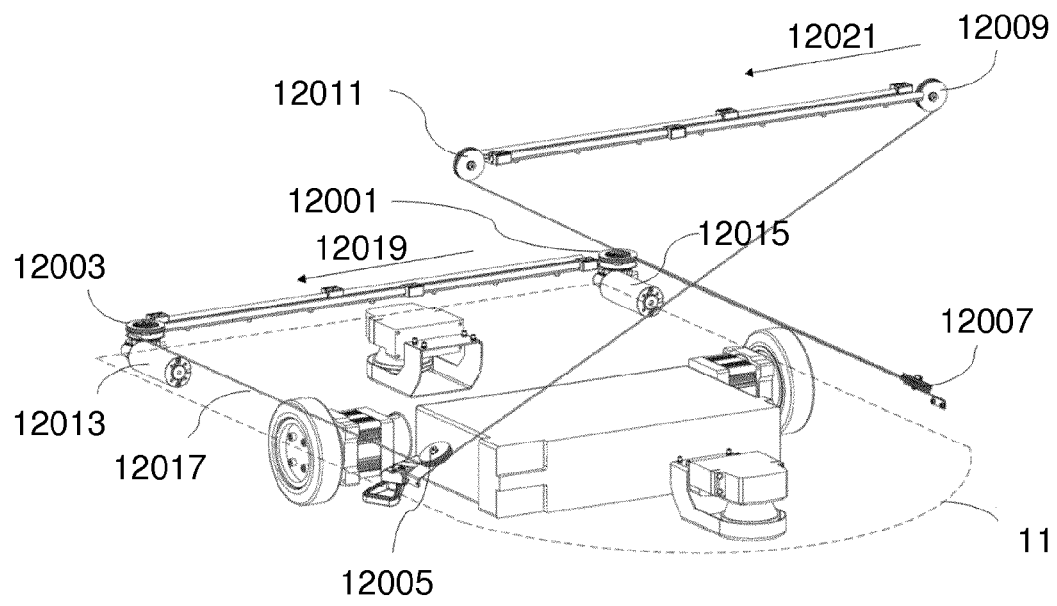
FIG. 12 is a view of the front of the drive unit with some of the exterior housing removed showing some selected internal components of the drive unit.

Referring now to FIG. 12 of the accompanying drawings, further details of the door closure and opening mechanism will be described. A plurality of double pulleys 12001, 12003, 12005, 12007, 12009, 12011 may be provided. In this arrangement each pulley of the double pulley arrangement is able to rotate freely, and independently of the other pulley. The double pulleys 12001, 12003, 12005, 12007 are positioned close to the base portion 1107 of the drive unit close to the outermost corner of the drive unit. One of the pulley of the double pulley arrangement 12003 is coupled to a first motor 12013 so that when the motor rotates 12013, the wider, and lower pulley shown in FIG. 12 rotates moving the cable 12017. The cable passes over the one of the two pulleys of each of the double pulley arrangements 12001, 12005, 12007, 12009, 120011 which are freely able to rotate, and consequently transfers linear motion at the bottom rear of the robot indicated by arrow 12019 to a linear motion at the top front of the drive unit as indicated by arrow 12021. Thus, by coupling one of the doors to a rail in close proximity to arrows 12019 and arrow 12021 one of the doors may be moved from an open position to a closed position, and vice versa by actuating a single motor 12013.

Figure 13:
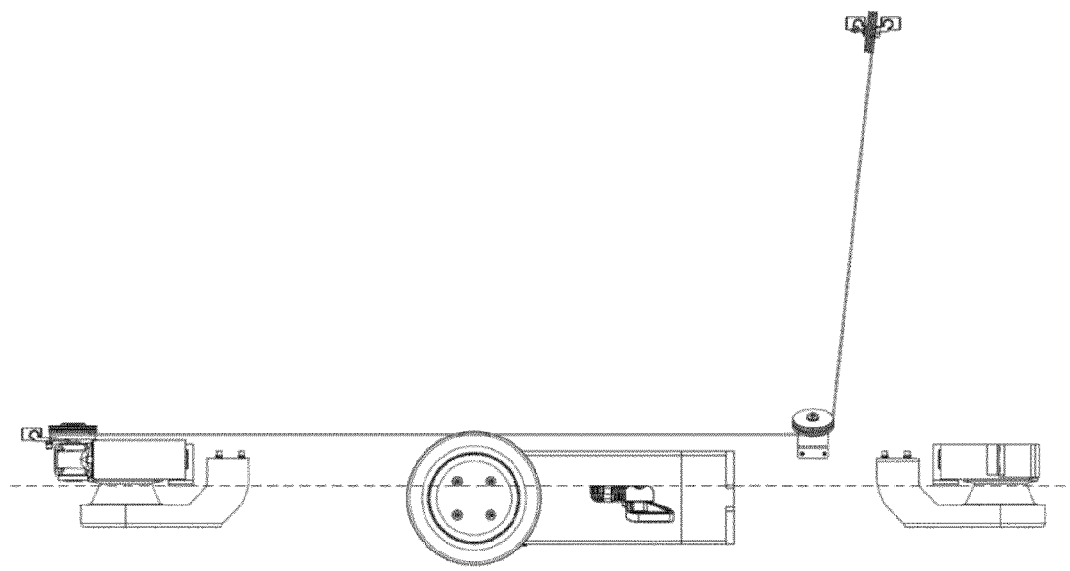
FIG. 13 is side view of some selected internal components of the drive unit showing the door mechanism including pulleys cable, and rail attachment for one of the doors.

A similar mechanism and second cable, not shown in FIG. 12 or 13 is provided for opening and closing of the second door, and once again, a single motor may be actuated to which is translated into a sliding movement by the pulley and cable means.

Figure 14:
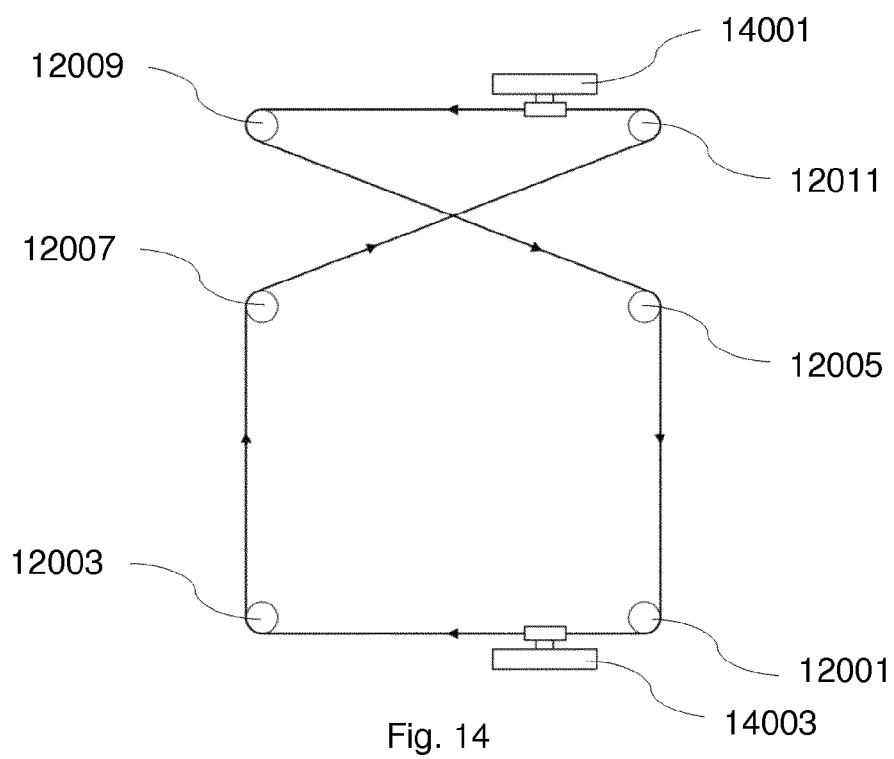
FIG. 14 is a schematic view illustrating the operating principle of the door mechanism for one of the doors.

Finally, FIG. 14 of the drawings shows a schematic illustration of the door actuator mechanism. In this figure only a single cable is shown for clarity, and the coupling of the cable to the each of the two rails 14001, 14003 is also illustrated In one specific example, the drive unit may meet the following technical specification:

General
1.1 Max dimension: 1600×1100×1600 mm (L×W×H)
1.2 Autonomy: minimum 4 h, optimal 12 h
1.3 Battery charging via cable
1.4 Scan&Fly integration on the platform:
  Top of Scan & Fly unit not higher than 1.50 m
  35-45 cm space between Scan & Fly and user to place the suitcase
  Display inclined of 10°+/−1°

Mobility
2.1 Max speed: 1 m/s
2.2 Ability to move forward and backward
2.3 Ability to turn on the spot
2.4 Max slopes: 3%
2.5 Max steps to overcome: 10 mm
2.5 Max gaps to overcome: 10 mm Perception
3.1 360° safety by way of 2 safety laser scanners
3.2 Laser scanner plane at 100 mm+/−50 mm from ground
3.3 No perception above the laser plane
3.4 No perception below the laser plan
3.5 No detection of holes (staircases, sidewalks, etc.)

Navigation
4.1 Path following and obstacles avoidance available
4.2 Manual movement by joystick possible Luggage Compartment
5.1 Platform able to carry two standard luggage (800× 500×400 mm, 32 kg)
5.2 Floor height of luggage compartment: max 300 mm
5.3 Manual loading and unloading
5.4 Door movement: automatic and manual (via push buttons)
5.5 Door locking: automatic From the foregoing, it will be appreciated that the mobile communication or client device may include a computing device, such as a desktop computer, a laptop computer, a tablet computer, a personal digital assistant, a mobile telephone, a smartphone, an internet enabled television, an internet enabled television receiver, an internet enabled games console or a portable games device.

The server may comprise a computer processor running one or more server processes for communicating with client devices. The server processes comprise computer readable program instructions for carrying out the operations of the present invention. The computer readable program instructions may be or source code or object code written in or in any combination of suitable programming languages including procedural programming languages such as C, object orientated programming languages such as C#, C++, Java, scripting languages, assembly languages, machine code instructions, instruction-set-architecture (ISA) instructions, and state-setting data.

The wired or wireless communication s networks described above may be public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers.

The user interface described above may comprise a Graphical User Interface.

Embodiments of the invention may include an on-screen graphical user interface. The user interface may be provided, for example, in the form of a widget embedded in a web site, as an application for a device, or on a dedicated landing web page. Computer readable program instructions for implementing the graphical user interface may be downloaded to the client device from a computer readable storage medium via a network, for example, the Internet, a local area network (LAN), a wide area network (WAN) and/or a wireless network. The instructions may be stored in a computer readable storage medium within the client device.

As will be appreciated by one of skill in the art, the invention described herein may be embodied in whole or in part as a method, a data processing system, or a computer program product including computer readable instructions. Accordingly, the invention may take the form of an entirely hardware embodiment or an embodiment combining software, hardware and any other suitable approach or apparatus.

The computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

Exemplary embodiments of the invention may be implemented as circuit board which may include a CPU, a bus, RAM, flash memory, one or more ports for operation of connected I/O apparatus such as printers, display, keypads, sensors and cameras, ROM, a communications sub-system such as a modem, and communications media.

Figure 4A:
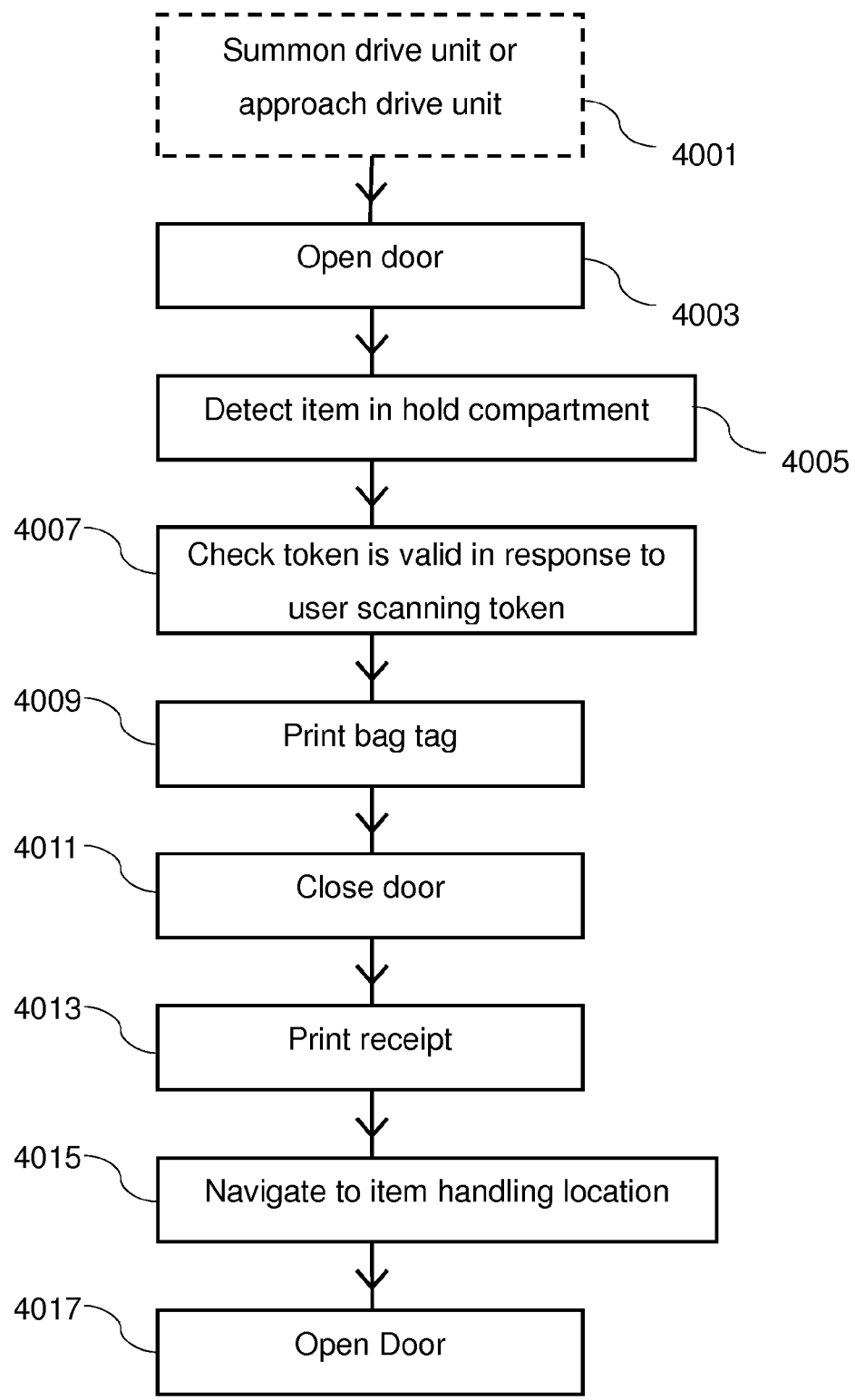
FIG. 4a is a flow diagram showing the main steps performed by an embodiment of the invention.
Figure 4B:
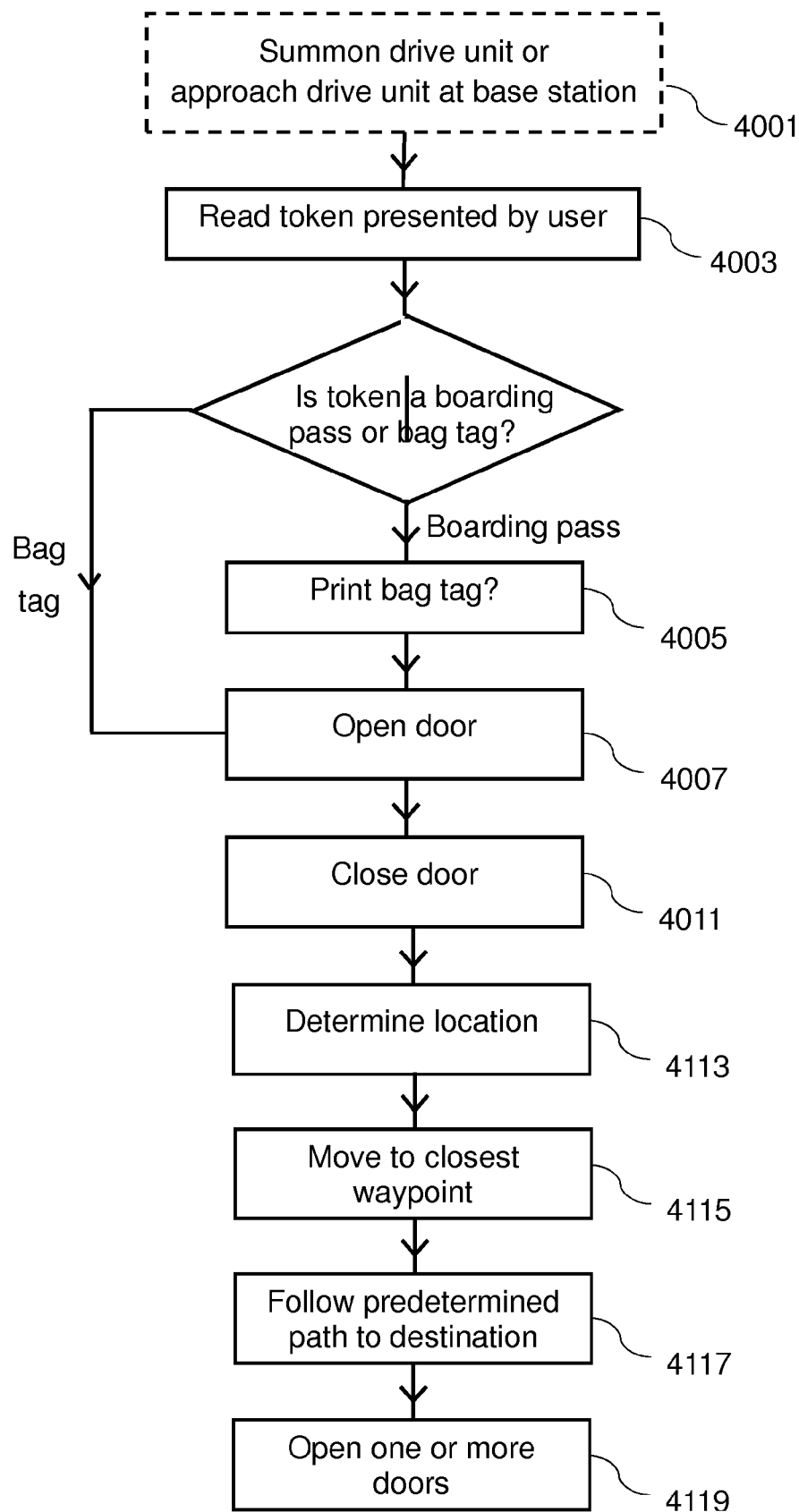
FIG. 4b is a flow diagram showing the main steps performed by a further embodiment of the invention.

The flowcharts of FIGS. 4a and b illustrate the operation of an example implementation of systems, methods, and computer program products according to various embodiments of the present invention. Each block in the flowchart or block diagrams may represent a module comprising one or more executable computer instructions, or a portion of an instruction, for implementing the logical function specified in the block. The order of blocks in the diagram is only intended to be illustrative of an example. In alternative implementations, the logical functions illustrated in particular blocks may occur out of the order noted in the figures. For example, two blocks shown as adjacent one another may be carried out simultaneously or, depending on the functionality, in the reverse order. Each block in the flowchart may be implemented in software, hardware or a combination of software and hardware.

The invention claimed is:

1. A mobile drive apparatus for item handling comprising:
   a. at least one platform for supporting an item;
   b. a drive means;
   c. a movable door coupled to the at least one platform and configured to move between an open position in which the platform is accessible to a user and a closed position in which the platform is enclosed; and
   d. a control means coupled to the drive means, wherein the control means comprises a user interface unit and the user interface unit is configured to distinguish between different types of tokens based on a barcode format associated with the tokens, wherein the control means is configured to:
      extract data from a token presented by the user to the interface unit,
      determine whether the presented token is a valid token based at least in part on the extracted data, and
      control the drive means to move a drive apparatus from a current location associated with an item pickup point to a second different location for processing by an item handling hub in response to receiving an indication that the token presented by the user is a valid token.

2. The mobile drive apparatus according to claim 1, wherein the control means is configured to communicatively couple with a remote computer or server, such as a departure control system, and receive a communication from said remote computer or server indicating that the token presented by the user has been determined to be a valid token.

3. The mobile drive apparatus according to claim 1, wherein the control means is configured to determine whether the presented token is a valid token, by comparing the extracted data with stored data.

4. The mobile drive apparatus according to claim 3, wherein the extracted data and the stored data contain data in at least one of the following fields: a format code, number of legs encoded, passenger name, electronic ticket indicator, operating carrier PNR code, from city airport code, to city airport code, operating carrier designator, flight number date of flight, compartment code, seat number, check-in sequence number, passenger status, marketing carrier field, sequence number field, a class name, a ticket type name, boarding time, boarding gate number;
   and wherein the control means is configured to determine that the token is a valid token when the extracted data matches the stored data in at least one of said fields.

5. The mobile drive apparatus according to claim 1, wherein the user interface unit is configured to determine whether the token is a bag tag or a boarding pass based on a format of the token.

6. The mobile drive apparatus according to claim 5, wherein the user interface unit is further configured to decode a one dimensional numeric license plate code associated with a bag tag, in response to determining that the token presented by the user is a bag tag.

7. The mobile drive apparatus according to claim 5, wherein the user interface unit is further configured to decode a two dimensional bar code associated with a boarding pass, in response to determining that the token presented by the user is a boarding pass.

8. The mobile drive apparatus according to claim 1, wherein the drive means comprises a differential drive arrangement comprising a first motor coupled to a first driving mechanism means and a second motor coupled to a second driving mechanism means.

9. The mobile drive apparatus according to claim 1, wherein a first and second driving mechanism means are positioned approximately in a center of the drive apparatus measured in a longitudinal direction from a front to a rear of the drive apparatus.

10. The mobile drive apparatus according to claim 1, further comprising an electrical power source, and wherein the power source comprises a split power source arrangement comprising first and second power sources.

11. The mobile drive apparatus according to claim 10, wherein the first power source is positioned in close proximity to an axis of rotation of driving mechanism means and where the second power source is positioned substantially at one end of the drive apparatus.

12. The mobile drive apparatus according to claim 1, wherein the drive apparatus comprises a plurality of doors and wherein each door is independently moveable.

13. The mobile drive apparatus according to claim 1, wherein the drive apparatus comprises a plurality of hold compartments separated by a partition.

14. The mobile drive apparatus according to claim 12, wherein each door comprises a first planar portion which extends to cover one face of the mobile drive apparatus and a second planar portion extends to cover a second different face of the mobile drive apparatus, and wherein the first and second planar portions are substantially perpendicular.

15. The mobile drive apparatus according to claim 1, further comprising a door mechanism for slideably moving the movable door between the open position and the closed position.

16. A mobile drive apparatus for item handling comprising:
 a. at least one platform for supporting an item;
 b. a drive means;
 c. a movable door coupled to the at least one platform and configured to move between an open position in which the platform is accessible to a user and a closed position in which the platform is enclosed; and
 d. a control means coupled to the drive means wherein the control means comprises a user interface unit, the user interface unit comprises reading means for reading a token presented by a user,
 wherein the control means is configured to:
  extract data from the token presented by the user to the interface unit,
  determine whether the presented token is a valid token based at least in part on the extracted data, and
  control the drive means to move a drive apparatus from a current location associated with an item pickup point to a second different location for processing by an item handling hub in response to receiving an indication that the token presented by the user is a valid token.

17. The mobile drive apparatus according to claim 16, wherein the control means is configured to communicatively couple with a remote computer or server, such as a departure control system, and receive a communication from said remote computer or server indicating that the token presented by the user has been determined to be a valid token.

18. The mobile apparatus according to claim 16, wherein the control means is configured to determine whether the presented token is a valid token, by comparing the extracted data with stored data.

19. The mobile drive apparatus according to claim 16, wherein the user interface unit is configured to determine whether the token is a bag tag or a boarding pass based on a format of the token.

20. The mobile drive apparatus according to claim 16, further comprising an electrical power source, and wherein the power source comprises a split power source arrangement comprising first and second power sources.

* * * * *